Patented Apr. 7, 1931

1,799,278

UNITED STATES PATENT OFFICE

WALTER O. BORCHERDT, OF MOUNTAIN LAKES, NEW JERSEY, ASSIGNOR TO THE NEW JERSEY ZINC COMPANY, OF NEW YORK, N. Y., A CORPORATION OF NEW JERSEY

TREATMENT OF ZINC-BEARING MATERIAL

No Drawing. Application filed December 8, 1928. Serial No. 324,811.

This invention relates to the treatment of zinc-bearing material, such as zinc ores, concentrates and the like, containing impurities in objectionable amounts, and has for its object the provision of improvements in the treatment of zinc-bearing material for the purification of the same.

Zinc-bearing materials, such as blende ores and concentrates, frequently contain water-insoluble compounds, for example, compounds of magnesium and calcium and the like, in objectionable amounts. Such impurities have a tendency to carry over into and unduly contaminate zinc products ultimately produced from the raw zinc-bearing material. The impurities of magnesium and calcium are generally present in zinc ores as carbonates, although they are sometimes present as silicates, aluminates, etc.

My investigations have shown that zinc-bearing material contaminated with objectionable amounts of water insoluble compounds of magnesium and/or calcium and the like may be appropriately subjected to a preliminary purification treatment whereby such impurities are in large part eliminated. The zinc-bearing material so purified may then be treated for the recovery of zinc products that are substantially pure, at least as far as magnesium and/or calcium compounds are concerned.

According to the present invention zinc-bearing material containing objectionable water-insoluble impurities in appreciable amounts is subjected to the action of an appropriate acid in amount adapted to convert the impurities into compounds of the acid while substantially inhibiting the formation of zinc compounds of the acid, and removing from the material so-treated such impurities as have been converted by the acid.

The invention will be better understood by a consideration of its practice on a representative unroasted zinc sulfide (blende) ore in the form of flotation concentrates. The finely divided concentrates in a water pulp were subjected in a reaction tank to the action of sulfuric acid in amount adapted to effect the conversion of the impurities, magnesium and calcium, into sulfates while at the same time inhibiting the formation of undesirable amounts of water-soluble zinc sulfate.

The amount of acid to employ must be regulated in accordance with the amount and kind of impurities present in the zinc-bearing material. That is to say, an amount of acid sufficient to convert substantially all of the water-insoluble compounds of magnesium and calcium into magnesium and calcium compounds of that acid should be employed, but at the same time such acid should be present in amount insufficient to form appreciable amounts of zinc compounds of that acid that are water-soluble. This result may be obtained by carefully regulating the amounts of acid added to the zinc-bearing material. The necessary chemical reactions go to completion more efficiently if the concentrates are in a finely divided state. The smaller the particle size of the concentrates, the larger will be the total surface area exposed to the action of the acid.

The impurities were present in the concentrates as carbonates of magnesium and calcium, and the reactions that took place during the sulfuric acid treatment may be indicated as follows:

(1) $MgCO_3 + H_2SO_4 \rightarrow MgSO_4 + H_2O + CO_2$ (2) $CaCO_3 + H_2SO_4 \rightarrow CaSO_4 + H_2O + CO_2$ After the acid reactions had gone to substantial completion, the concentrates were leached with water. Since magnesium sulfate is relatively soluble in water, a very large proportion of that impurity was removed while in aqueous solution. Calcium sulfate, while less soluble than magnesium sulfate, was present in the pulp in relatively small quantity and in such a minutely divided state that it was soluble in the amount of water conveniently used in the leaching operation. The leaching operation was repeated with fresh amounts of water until the wash waters showed little or no trace of the sulfates of magnesium and calcium.

An analysis of the concentrates showed that substantially all of the magnesium and calcium compounds had been removed. The removal of these compounds was effected, moreover, without the loss of appreciable amounts of zinc. This zinc-bearing material was then in excellent condition for the production of relatively pure zinc products, at least as far as magnesium and calcium are concerned.

While the practice of the invention has been shown with the use of sulfuric acid, other acids in aqueous solution, such as hydrochloric, etc. may be employed. Such acid gases as sulfur dioxide, sulfur trioxide, etc. have also been advantageously employed. These gases are preferably introduced into an aqueous pulp of the zinc-bearing material. Suitable mixtures of acids may also be utilized in the practice of the invention. In each instance, however, the amount of acid employed must be carefully regulated in accordance with the impurities present in the zinc-bearing material, so that substantially all of the impurities may be converted into compounds of the acid while at the same time inhibiting the formation of appreciable amounts of zinc compounds of the acid.

I claim:

1. The method of treating zinc-bearing material in the form of zinc sulphide concentrates containing water-insoluble compounds of calcium which comprises subjecting the concentrates in the form of an aqueous pulp to the action of sulphuric acid regulated in amount adapted to attack and effect the conversion of the compounds of calcium into minute particles of suspended calcium sulphate without at the same time materially attacking the zinc sulphide, and separating the minute particles of suspended calcium sulphate particles from the zinc sulphide concentrates.

2. The method of treating zinc-bearing material in the form of zinc concentrates contaminated with water-insoluble compounds of magnesium and calcium in objectionable amounts which comprises subjecting a pulp of the material to the action of sulfuric acid in amount adapted to convert the original compounds of magnesium and calcium to the sulfates of magnesium and calcium while substantially preventing the formation of zinc sulfate, the sulfate of calcium being present in the pulp for the most part as minute suspended particles, and leaching the so-treated material to effect the removal of the magnesium and calcium sulfates.

3. The method of treating zinc-bearing material in the form of unroasted blende concentrates containing compounds of magnesium and calcium as impurities in objectionable amounts which comprises treating the concentrates with sulfuric acid in aqueous solution in amount sufficient to cause a substantially complete conversion of said compounds of magnesium and calcium into sulfates of those metals but insufficient to cause the conversion of appreciable amounts of zinc sulfide into zinc sulfate, the sulfate of calcium being present in the pulp for the most part as minute suspended particles, and washing the concentrates so treated to effect the removal of the sulfates of magnesium and calcium.

In testimony whereof I affix my signature.

WALTER O. BORCHERDT.